June 19, 1923.    1,459,242

L. F. O'FLAHERTY ET AL

VALVE

Filed March 31, 1922    2 Sheets-Sheet 1

Witnesses:

Inventors:
Leo F. O'Flaherty &
William L. Kirkpatrick

Their Attorney

June 19, 1923.  L. F. O'FLAHERTY ET AL  1,459,242

VALVE

Filed March 31, 1922  2 Sheets-Sheet 2

Witnesses:

Inventors:
Leo F. O'Flaherty &
William L. Kirkpatrick
By Joshua R. H. Potts
Their Attorney Patented June 19, 1923.

1,459,242

UNITED STATES PATENT OFFICE.

LEO F. O'FLAHERTY AND WILLIAM L. KIRKPATRICK, OF ELGIN, ILLINOIS.

VALVE.

Application filed March 31, 1922. Serial No. 548,333.

*To all whom it may concern:*

Be it known that we, LEO F. O'FLAHERTY and WILLIAM L. KIRKPATRICK, citizens of the United States, and residents of the city of Elgin, county of Kane, and State of Illinois, have invented certain new and useful Improvements in Valves, of which the following is a specification.

This invention relates to valves, and more particularly to mixing valves for hot and cold water, or other fluids, and has for its object the provision of an improved construction of this kind, which is simple and effective in operation.

Another object is to provide such a valve with positive means independent of the mixing means for sealing the valve to prevent leakage therefrom.

Other and further objects will appear hereinafter.

The invention consists in the combinations and arrangements of parts hereinafter described and claimed.

Figure 2:
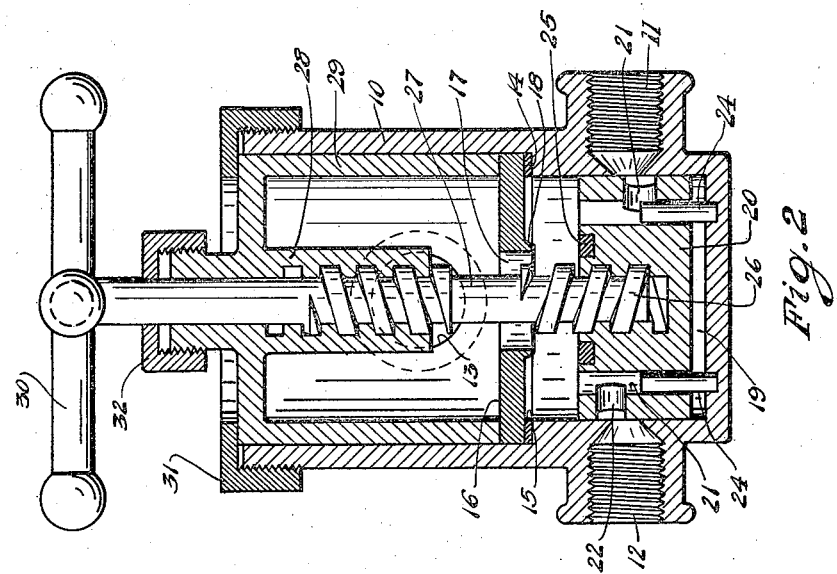
Figure 1:
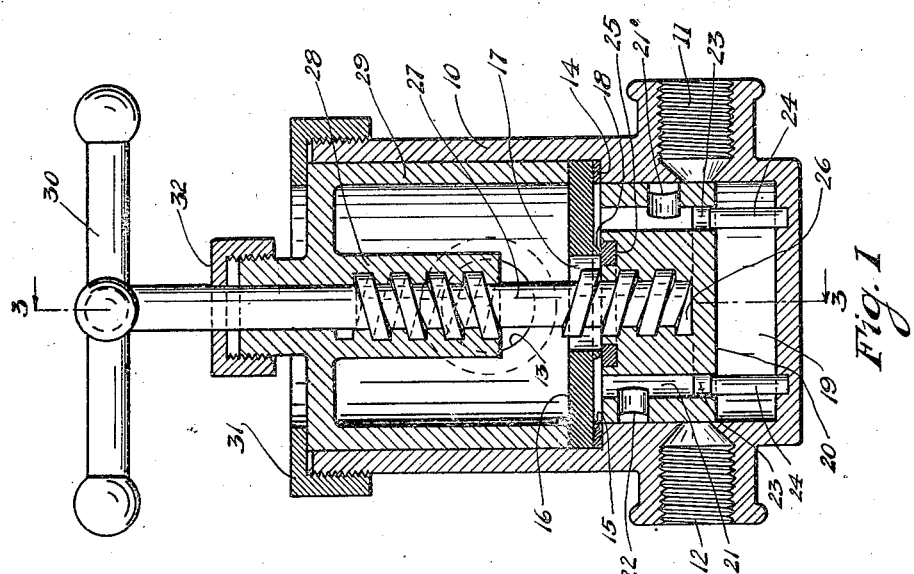
Figure 4:
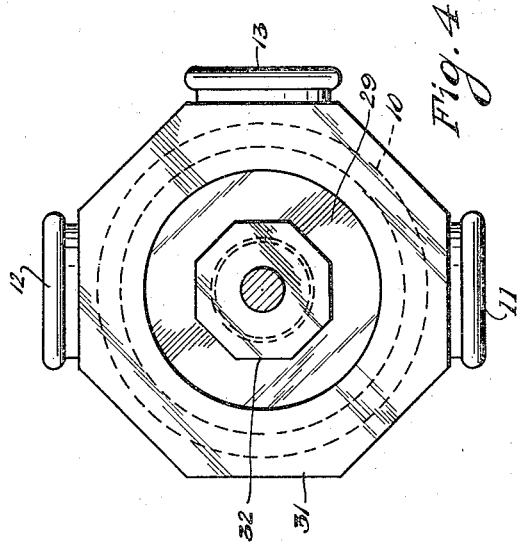
Figure 5:
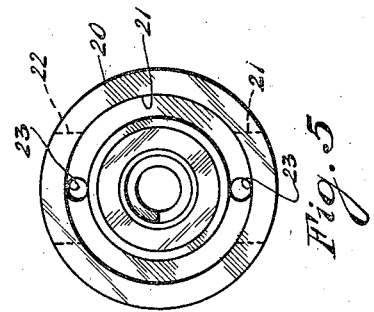
Figure 3:
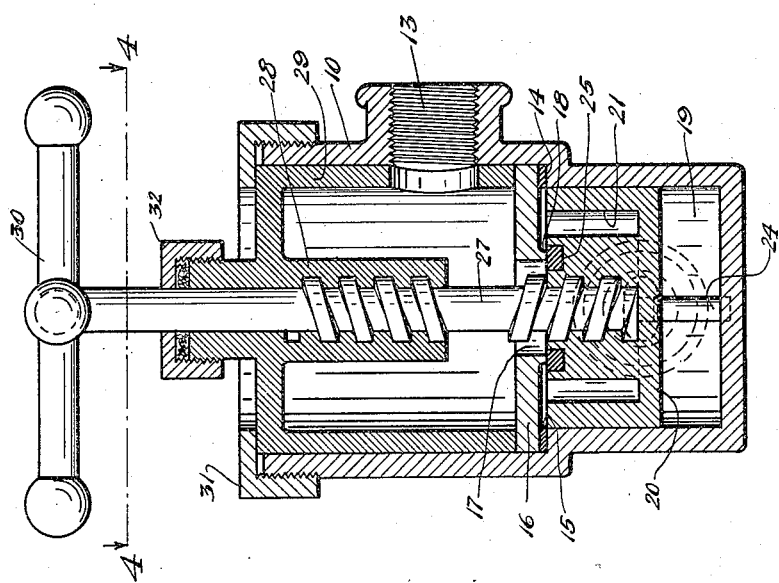

The invention will be best understood by reference to the accompanying drawings forming a part of this specification, and in which, Fig. 1 is a vertical sectional view of the invention, showing the valve in inoperative position, Fig. 2 is a similar vertical sectional view of the invention, showing the valve in position to admit equal amounts of different fluids to the mixing chamber, Fig. 3 is a sectional view on line 3—3 of Fig. 1, Fig. 4 is a sectional view on line 4—4 of Fig. 3, and Fig. 5 is a top plan view of the valve proper.

The invention consists of a casing 10 of any suitable material, preferably provided with suitable inlets 11 and 12, the inner ends of which are tapered as shown, and an outlet 13. The inner periphery of the casing, is preferably provided with shoulders 14 upon which may be placed a gasket 15, of any suitable material. Preferably seated upon gasket 15 is a partition 16 of any suitable material, such partition preferably having an aperture 17 therein surrounded on its under side by an annular rib 18.

Mounted in the mixing chamber 19 formed by the partition 16 is a slidable valve 20, which may be of any suitable kind, in this particular instance being in the form of a piston or disc. Such disc preferably has an annular recess 21 therein, as shown, and the periphery of such disc is provided with oppositely disposed offset ports 21' and 22, such ports communicating with the annular recess 21. The valve may be provided with bores 23, which preferably communicate with the annular recess 21, and slidably engage pins 24 in the bottom of the chamber 19 to prevent rotation of the valve in the chamber 10, but permit sliding movement therein. Preferably mounted in the inner face of the disc 20 is a washer or packing ring 25, which is adapted to abut against the annular rib 18 when the valve is in closed position.

Any desirable means may be employed for imparting slidable movement to valve 20, but we preferably provide such valve with a threaded socket 26 for the reception of the threaded end of a stem 27, which may project outwardly through the aperture 17 in the partition 16. The outer portion of the stem 27 also has threads thereon, preferably oppositely disposed to the threads on the lower end of the stem, and such threads engage corresponding threads in a boss 28, provided on the inner face of a cylindrical member 29, mounted in the casing 10, such stem projecting through the outer end of the member 29, and having mounted thereon a suitable handle 30 for turning the stem 27. A cap 31 is threaded onto the casing 10 and securely holds the cylindrical member 29 and through such member, the partition 16 in position. A cap 32 may be threaded onto member 29, as shown.

In operation it will be seen that by turning the handle sliding movement is imparted to the disc 20, initially causing the port 21' to register with the inlet 11, which permits say cold water to enter the recess 21 and pass from the same through the aperture 17 and be discharged through the outlet 13. Further movement of the disc 20 partially closes the inlet 11 and partially opens the inlet 12, thereby permitting both hot and cold water to enter the recess 21, and pass from the outlet as before. Still further movement of the disc 20 completely closes the inlet 11 and completely opens the inlet 12 admitting only hot water. Movements of the valve to positions intermediate those described of course mixes the hot and cold water so as to obtain water of any desired temperature. Reversing the movement of the handle 30, returns the disc 20 to its original position against the rib 18, which prevents leakage of water through the mixing valves, as so frequently happens. The oppositely disposed threads are provided for the purpose of accelerating the movement of the valve, the valve by this construction being capable of very rapid movement.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. A mixing valve comprising a casing; a partition dividing said casing into mixing and discharge chambers, said partition having an aperture therein; inlet ducts for said mixing chamber; a mixing valve slidably mounted in said mixing chamber; opposite ports in the periphery of said valve; a circumferential recess in said valve communicating with said ports and said mixing chamber; and means on said valve within said recess and adapted in operative position of the valve to close said aperture.

2. A mixing valve comprising a casing; a partition dividing said casing into mixing and discharge chambers, said partition having an aperture therein; inlet ducts for said mixing chamber; a mixing valve in said chamber having opposite ports therein adapted in various positions to register with said inlets; a circumferential recess in said valve communicating with said ports and said mixing chamber, a threaded socket in said valve surrounded by said recess; and a threaded stem engaging said socket for slidably operating said valve.

3. A mixing valve comprising a casing; a partition dividing said casing into mixing and discharge chambers, said partition having an aperture therein; inlet ducts for said mixing chamber; a mixing valve in said chamber having offset ports therein adapted in various positions to register with said ducts; a circumferential recess in said valve communicating with said ports and said mixing chamber; a stem threaded in said valve for slidably operating same; and studs secured to said casing and projecting into said recess to prevent rotation of said valve during its sliding movement.

4. A mixing valve comprising a casing; a partition dividing said casing into mixing and discharge chambers, and having a communicating aperture therein; inlet ducts for said mixing chamber; a mixing valve slidably mounted in said mixing chamber and having offset ports therein adapted in various positions to communicate with said ducts; a circumferential recess in said valve communicating with said ducts and said mixing chamber; a threaded socket in said valve disposed within said recess; a stem having oppositely disposed threads thereon adapted to engage said threaded socket for slidably operating said valve; and means on said valve surrounding said socket and adapted in inoperative position of said valve to close said aperture.

5. A mixing chamber having inlets and an outlet; a valve mounted in said chamber and having an annular recess, there being ducts communicating with said recess and adapted to register with said inlets, and apertures communicating with said recesses; pins in said mixing chamber projecting into said apertures; and means for reciprocating said valve in said mixing chamber.

In testimony whereof we have signed our names to this specification in the presence of two subscribing witnesses.

LEO F. O'FLAHERTY.
WILLIAM L. KIRKPATRICK.

Witnesses:
JOSHUA R. H. POTTS,
FREDA C. APPLETON.